United States Patent
Wilfert et al.

[15] 3,697,097
[45] Oct. 10, 1972

[54] SAFETY STEERING FOR MOTOR VEHICLES

[72] Inventors: Karl Wilfert, Gerlingen-Waldstadt; Bela Barenyi, Maichingen (Wurtt.), both of Germany

[73] Assignee: Daimler-Benz Aktiengesellschaft, Stuttgart-Unterturkheim, Germany

[22] Filed: Nov. 26, 1969

[21] Appl. No.: 880,104

[30] Foreign Application Priority Data

Nov. 27, 1968 Germany..........P 18 11 093.5

[52] U.S. Cl......................280/87 A, 74/493, 180/82
[51] Int. Cl..............................................B60r 21/02
[58] Field of Search.....280/87 R, 87 A; 180/82, 100, 180/101, 103, 78; 74/492, 493

[56] References Cited

UNITED STATES PATENTS

| | | |
|---|---|---|
| 3,556,550 | 1/1971 | Franchini.................280/87 A |
| 3,298,707 | 1/1967 | Gerin.........................280/87 |
| 3,058,368 | 10/1962 | Wagner..................280/87 X |
| 3,434,367 | 3/1969 | Renneker et al.........280/87 X |
| 3,504,569 | 4/1970 | Zoltok........................74/493 |
| 3,167,974 | 2/1965 | Wilfert................280/87 UX |
| 3,521,724 | 7/1970 | Mayer....................280/87 X |
| 2,899,214 | 8/1959 | D'Antini.................74/492 X |

FOREIGN PATENTS OR APPLICATIONS 611,716  10/1960  Italy...........................180/78

Primary Examiner—Benjamin Hersh
Assistant Examiner—John P. Silverstrim
Attorney—Craig, Antonelli and Hill

[57] ABSTRACT

A safety steering arrangement for motor vehicles in which the steering wheel or a part carrying the steering wheel is so secured at the vehicle superstructure that a pivoting of the steering wheel about a vehicle transverse axis can take place under the influence of a force which exceeds the force acting on the steering wheel during normal operation.

22 Claims, 8 Drawing Figures

INVENTORS
KARL WILFERT
BELA BARENYI

BY Craig, Antonelli, Stewart & Hill

ATTORNEYS

INVENTORS
KARL WILFERT
BELA BARENYI

BY *Craig, Antonelli, Stewart & Hill*
ATTORNEYS

SAFETY STEERING FOR MOTOR VEHICLES

The present invention relates to a safety steering device for motor vehicles, especially with non-rigid transmitting members between steering spindle and wheels.

Recently, in numerous types of motor vehicles, large impact surfaces have been created inside of the steering wheel rim in order to protect the driver as far-reachingly as possible in case of a collision. However, it has been discovered that an impact of the driver against the steering wheel does not generally take place in the plane of the steering wheel but instead that the driver is initially thrown against the lower area of the steering wheel rim. A yieldingness of the steering wheel can be achieved by a deformation member, a so-called impact pot arranged between the steering wheel and the upper end of the steering spindle or steering column; however, a safe deflection of the steering wheel into the body plane of the driver at the instant of an impact is now always assured thereby.

Accordingly, for purposes of avoiding this disadvantage, a safety steering arrangement for motor vehicles, especially with non-rigid transmitting members between steering spindle and wheels is proposed whereby according to the present invention, the steering wheel or a part carrying the steering wheel is so secured at the vehicle superstructure that a deflection of the steering wheel about a vehicle cross axis can take place under the influence of a force which exceeds the force acting on the steering wheel during normal operation.

In a preferred type of construction of the present invention, the steering column of the steering system is carried by a support extending in the vehicle transverse direction which is rotatable under the influence of a preferably adjustable friction force between the support and the fixed parts of the vehicle superstructure.

Advantageously, the friction force is thereby produced by cup springs arranged at both ends of the support which are preferably stressed by way of a common tie rod.

It is proposed in another advantageous type of construction of the present invention that the steering column of the steering system is carried by a tubular member extending in the vehicle transverse direction which is secured at the vehicle superstructure by way of a rubber-metal bearing support in such a manner that the tubular member is non-rotatably held in an inner metal bush of the bearing and the bearing itself is non-rotatably held at the vehicle superstructure by way of an outer metal bust.

It may furthermore be of advantage if the steering column of the steering system is carried by an elastically or plastically deformable support of non-circular cross section extending in the vehicle transverse direction which is preferably non-rotatably supported at the vehicle superstructure in rubber or synthetic resinous material bearings.

Accordingly, it is an object of the present invention to provide a safety steering arrangement for motor vehicles which avoids by simple means the aforementioned shortcomings and drawbacks encountered in the prior art.

Another object of the present invention resides in a safety steering device for motor vehicles which protects the driver against injuries in case of collisions when the driver is thrown against the steering wheel, particularly against the lower area thereof.

A further object of the present invention resides in a safety steering assembly for motor vehicles that assures a safe deflection of the steering wheel into the body plane of the driver at the instant of an impact.

Still another object of the present invention resides in a safety steering assembly of the type described above which is simple in construction yet reliable in operation.

These and further objects, features, and advantages of the present invention will become more obvious from the following description, when taken in connection with the accompanying drawing which shows, for purposes of illustration only, several embodiments in accordance with the present invention, and wherein.

Figure 1:
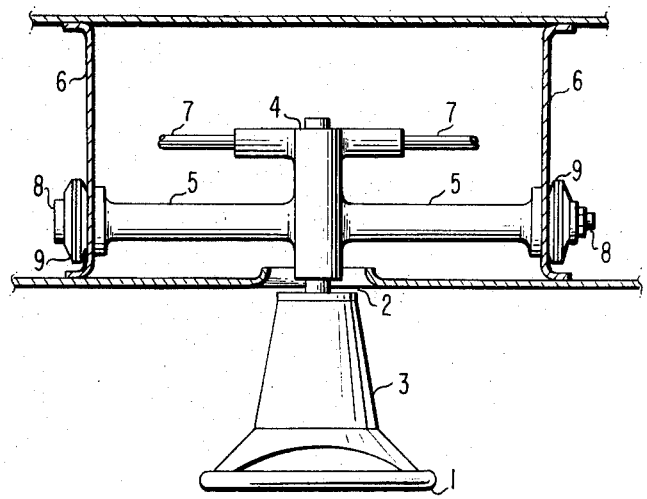
FIG. 1 is a plan view on a safety steering arrangement in accordance with the present invention.
Figure 2:
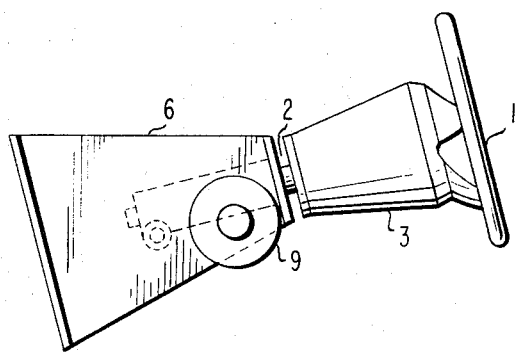
FIG. 2 is a side elevational view of the safety steering arrangement of FIG. 1.
Figure 3:
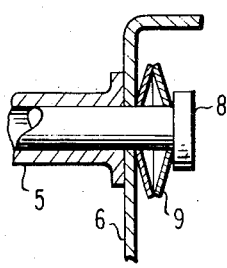
FIG. 3 is a partial cross-sectional view, on an enlarged scale, illustrating a detail of the safety steering assembly of FIG. 1.

Referring now to the drawing wherein like reference numerals are used throughout the various views to designate like parts, and more particularly to FIGS. 1 to 3, in the embodiment illustrated in these figures, a conventional deformation member 3 is arranged between the steering wheel 1 and the steering spindle 2. The steering column 4 of the steering system is carried by a tubular member 5 extending in the vehicle transverse direction which extends between two wall parts 6 of the vehicle superstructure. The transmission of the steering movements takes place from the steering spindle 2 in a conventional manner not illustrated in detail, for example, by way of pinion and rack, to preferably flexible transmitting elements 7.

A tie rod 8 is arranged on the inside of the tubular member 5 which projects beyond the tubular member 5 at both ends and extends also through the wall parts 6. The tie rod 8 serves for stressing the cup springs 9 by means of which the necessary friction force is produced.

Figure 4:
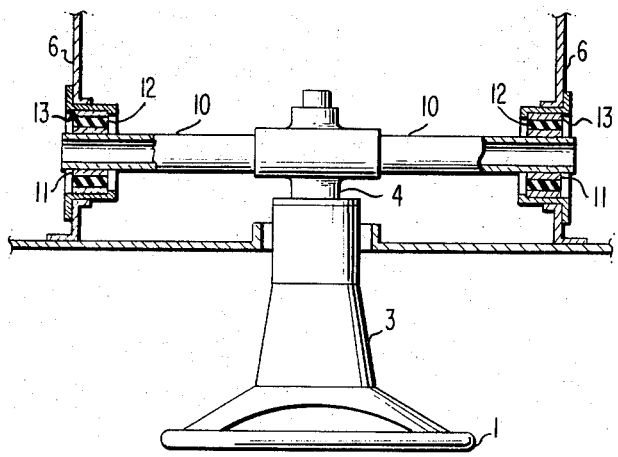
FIG. 4 is a plan view won a modified embodiment of a safety steering arrangement in accordance with the present invention.
Figure 5:
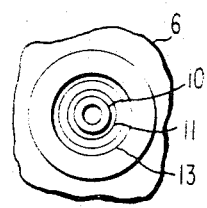
FIG. 5 is a partial side view of a rubber-metal-bearing used with the embodiment according to FIG. 4.

In the embodiment illustrated in FIGS. 4 and 5, the steering column 4 of the steering system is carried by a tubular member 10 extending in the vehicle transverse direction which is non-rotatably held at both of its ends in an inner metal bush 11 of a rubber-metal bearing 12 whereby the rubber-metal bearing 12 is non-rotatably supported in a wall part 6 of the vehicle superstructure by way of an outer metal bush 13.

Figure 6:
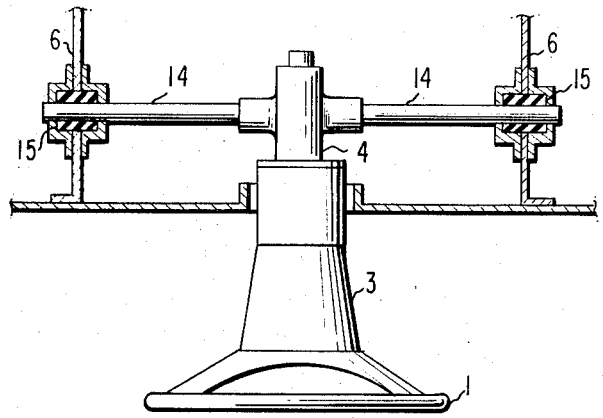
FIG. 6 is a plan view on a still further modified embodiment of a safety steering arrangement in accordance with the present invention.
Figure 7:
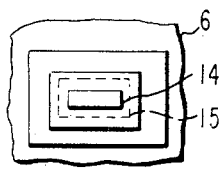
FIG. 7 is a partial side view of a bearing made from rubber or synthetic resinous material used in connection with the embodiment according to FIG. 6.

In the embodiment according to FIGS. 6 and 7, the steering column 4 of the steering system is carried by a support member 14 extending in the vehicle transverse direction which has a rectangular cross section and is elastically or plastically deformable under the influence of a predetermined force. The support member 14 is supported at both of its ends in a rubber or synthetic resinous material bearing 15 at a wall part 6 of the vehicle superstructure.

Figure 8:
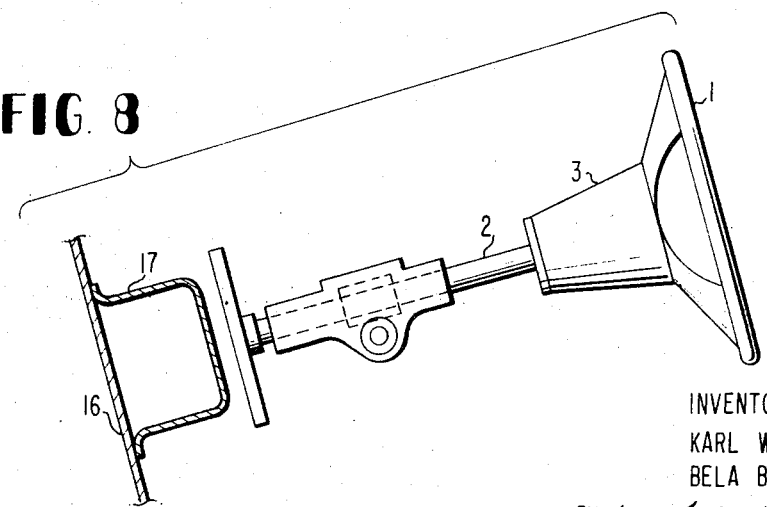
FIG. 8 is a side elevational view of a still further modified embodiment of a safety steering arrangement in accordance with the present invention provided with two deformation members.

In FIG. 8 of the drawing is illustrated how a safety steering arrangement according to the present invention can be combined with a deformation member 17 arranged between the lower end of the steering spindle 2 or of the steering column 4 and a fixed part 16 of the vehicle superstructure.

While we have shown and described several embodiments in accordance with the present invention, it is understood that the same is not limited thereto but is susceptible of numerous changes and modifications as known to those skilled in the art, and we therefore do not wish to be limited to the details shown and described herein, but intend to cover all such changes and modifications as are within the scope of those skilled in the art.

We claim:

1. A safety steering assembly for motor vehicles with a superstructure and steering wheel means, said assembly comprising a steering column for supporting said steering wheel means at one end thereof, transverse support means for supporting said steering column with respect to said superstructure, said transverse support means extending along a transverse axis in a substantially perpendicular direction to the vehicle driving direction, pivotable attachment means at each outer end of said support means attaching the support means to the vehicle superstructure for pivotal movement about said transverse axis, and wherein each pivotable attachment means includes force retarding means for resisting the pivotal movement of said support means and associated steering column such that said pivotal movement will not take place unless forces acting on the steering wheel means are in excess of normal operating forces acting thereon.

2. A safety steering assembly according to claim 1, wherein said force retarding means includes means for introducing frictional forces between parts mounted for movement with respect to one another.

3. A safety steering assembly according to claim 2, wherein said friction force is adjustable.

4. A safety steering assembly according to claim 2, characterized in that said friction force is produced by cup spring means arranged at both ends of the support means.

5. A safety steering assembly according to claim 4, characterized in that said cup spring means are stressed by a common tie rod.

6. A safety steering assembly according to claim 2, further comprising deformation means arranged between the steering wheel means and one of the two parts consisting of a steering spindle and the steering column.

7. A safety steering according to claim 2, further comprising deformation means arranged between the lower end of one of the two parts consisting of a steering spindle and the steering column, on the one hand, and a fixed part of the motor vehicle superstructure, on the other.

8. A safety steering assembly according to claim 1, characterized in that said support means includes tubular sections in the area of said attachment means and in that rubber-metal bearing means are provided for securing said tubular sections at the vehicle superstructure in such a manner that the tubular sections are non-rotatably held in inner metal bushes of the respective bearing means, outer metal bushes of said respective bearing means being provided which are non-rotatably held at the vehicle superstructure, and rubber means being secured at both said inner and outer metal bushes for elastically resisting the pivotal movement of said support means.

9. A safety steering assembly according to claim 8, further comprising deformation means arranged between the steering wheel means and one of the two parts consisting of a steering spindle and the steering column.

10. A safety steering according to claim 8, further comprising deformation means arranged between the lower end of one of the two parts consisting of a steering spindle and the steering column, on the one hand, and a fixed part of the motor vehicle superstructure, on the other.

11. A safety steering according to claim 8, further comprising air bellows means is arranged between the lower end of one of the two parts consisting of a steering spindle and the steering column, on the one hand, and a fixed part of the vehicle superstructure, on the other.

12. A safety steering assembly according to claim 1, characterized in that said attachment means include deformable mounting means of non-circular cross-section surrounding the ends of said support means, said deformable mounting means being non-rotatably supported at their respective outer peripheries at the vehicle superstructure, the internal surfaces of said mounting means being non-rotatably connected to said support means.

13. A safety steering assembly according to claim 12, wherein said mounting means is elastically deformable.

14. A safety steering assembly according to claim 12, wherein said mounting means is plastically deformable.

15. A safety steering assembly according to claim 12, wherein said mounting means is non-rotatably supported at the vehicle superstructure by way of elastic bearing means.

16. A safety steering assembly according to claim 15, further comprising a deformation means arranged between the steering wheel means and one of the two parts consisting of a steering spindle and the steering column.

17. A safety steering according to claim 15, further comprising deformation means arranged between the lower end of one of the two parts consisting of a steering spindle and the steering column, on the one hand, and a fixed part of the motor vehicle superstructure, on the other.

18. A safety steering according to claim 15, further comprising air bellows means arranged between the lower end of one of the two parts consisting of a steering spindle and the steering column, on the one hand, and a fixed part of the vehicle superstructure, on the other.

19. A safety steering assembly according to claim 1, further comprising means arranged between the steering wheel means and one of the two parts consisting of a steering spindle and the steering column.

20. A safety steering assembly according to claim 19, characterized in that a further deformation means is arranged between the lower end of one of the two parts consisting of the steering spindle and the steering column, on the one hand, and a fixed part of the motor vehicle superstructure, on the other.

21. A safety steering according to claim 19, further comprising air bellows means arranged between the lower end of one of the two parts consisting of the steering spindle and the steering column, on the one hand, and a fixed part of the vehicle superstructure, on the other.

22. A safety steering according to claim 1, further comprising air bellows means arranged between the lower end of one of the two parts consisting of a steering spindle and the steering column, on the one hand, and a fixed part of the vehicle superstructure, on the other.

* * * * *